(12) United States Patent
Kent

(10) Patent No.: US 11,444,757 B2
(45) Date of Patent: *Sep. 13, 2022

(54) QUANTUM TOKENS

(71) Applicants: Adrian Kent, Cambridge (GB); Cambridge Quantum Computing Limited, London (GB)

(72) Inventor: Adrian Kent, Cambridge (GB)

(73) Assignees: Cambridge Quantum Computing Limited, London (GB); Adrian Kent, Cambridge (GB)

( * ) Notice: Subject to any disclaimer, the term of this patent is extended or adjusted under 35 U.S.C. 154(b) by 65 days.

This patent is subject to a terminal disclaimer.

(21) Appl. No.: 17/031,396

(22) Filed: Sep. 24, 2020

(65) Prior Publication Data

US 2021/0111883 A1  Apr. 15, 2021

Related U.S. Application Data

(63) Continuation of application No. 15/739,413, filed as application No. PCT/GB2016/051958 on Jun. 30, 2016, now Pat. No. 10,790,972.

(30) Foreign Application Priority Data

Jul. 2, 2015  (GB) .................................... 1511652

(51) Int. Cl.
*H04L 9/08* (2006.01)
*G06N 10/00* (2022.01)
(Continued)

(52) U.S. Cl.
CPC ............ *H04L 9/0852* (2013.01); *G06F 7/588* (2013.01); *G06N 10/00* (2019.01); *H04L 9/32* (2013.01)

(58) Field of Classification Search
CPC ....... H04L 9/0852; H04L 9/32; H04L 9/3213; G06F 7/588; G06N 10/00; G06Q 20/38
See application file for complete search history.

(56) References Cited

U.S. PATENT DOCUMENTS

| | | | |
|---|---|---|---|
| 6,678,379 B1 * | 1/2004 | Mayers | .................. H04B 10/70 380/278 |
| 7,483,142 B2 | 1/2009 | Kent | |

(Continued)

FOREIGN PATENT DOCUMENTS

| | | | |
|---|---|---|---|
| CN | 203799050 U | * | 8/2014 |
| GB | 2542751 | | 4/2017 |

(Continued)

OTHER PUBLICATIONS

Aronson, S. et al. "Quantum Money from Hidden Subspaces," Proceedings of ACM STOC 2012, Mar. 25, 2012, pp. 1-46.
(Continued)

*Primary Examiner* — Shahriar Zarrineh
(74) *Attorney, Agent, or Firm* — Knobbe Martens Olson & Bear, LLP

(57) ABSTRACT

Secure, semi-classical authentication schemes are presented. An authentication token is generated by applying a predetermined measurement to a plurality of random quantum states to obtain a sequence of classical measurement outcomes. The token is validated by receiving the classical measurement outcomes and verifying whether the sequence corresponds to a statistically plausible result for the predetermined measurement of the plurality of quantum states.

25 Claims, 3 Drawing Sheets

(51) Int. Cl.
*H04L 9/32* (2006.01)
*G06F 7/58* (2006.01)

(56) References Cited

U.S. PATENT DOCUMENTS

| | | | |
|---|---|---|---|
| 7,667,995 B1 * | 2/2010 | Leuenberger | B82Y 10/00 398/40 |
| 7,697,693 B1 | 4/2010 | Elliott | |
| 7,706,694 B2 | 4/2010 | Freeling | |
| 7,983,422 B2 * | 7/2011 | Kent | H04L 9/0858 380/278 |
| 8,897,449 B1 * | 11/2014 | Broadbent | H04L 9/0891 380/278 |
| 2002/0097874 A1 | 7/2002 | Foden et al. | |
| 2002/0117656 A1 * | 8/2002 | Amin | H01L 39/223 257/E39.015 |
| 2003/0002674 A1 * | 1/2003 | Nambu | H04L 9/0852 505/202 |
| 2003/0093451 A1 * | 5/2003 | Chuang | G06N 10/00 708/520 |
| 2003/0133714 A1 * | 7/2003 | Gat | H04L 9/0852 398/140 |
| 2003/0169880 A1 * | 9/2003 | Nambu | H04L 9/0852 380/256 |
| 2004/0012407 A1 | 1/2004 | Amin | |
| 2004/0044940 A1 * | 3/2004 | Lawrence | G06N 10/00 714/746 |
| 2004/0086280 A1 * | 5/2004 | Duraffourg | H04B 10/508 398/186 |
| 2004/0234264 A1 * | 11/2004 | Sasaki | B82Y 10/00 398/65 |
| 2005/0157875 A1 * | 7/2005 | Nishioka | H04L 9/0858 380/46 |
| 2005/0249352 A1 | 11/2005 | Choi | |
| 2006/0002563 A1 | 1/2006 | Bussieres | |
| 2006/0056631 A1 * | 3/2006 | Beausoleil | B82Y 10/00 380/256 |
| 2006/0120529 A1 * | 6/2006 | Gisin | H04L 9/0852 380/256 |
| 2008/0101612 A1 * | 5/2008 | Imai | H04L 9/0852 380/278 |
| 2010/0046754 A1 | 2/2010 | Gilfedder | |
| 2010/0111304 A1 * | 5/2010 | Bloch | H04L 9/0852 380/278 |
| 2010/0150349 A1 * | 6/2010 | Choi | H04L 9/0852 380/256 |
| 2012/0177201 A1 | 7/2012 | Ayling | |
| 2013/0016835 A1 * | 1/2013 | Zbinden | H04L 9/0852 380/255 |
| 2013/0258453 A1 | 10/2013 | Arahira | |
| 2014/0068765 A1 | 2/2014 | Choi | |
| 2014/0205302 A1 * | 7/2014 | Chen | H04B 10/5561 398/188 |
| 2014/0324766 A1 | 10/2014 | Alboszta | |
| 2014/0358793 A1 | 12/2014 | Patawski et al. | |
| 2015/0003824 A1 | 1/2015 | Bovino | |
| 2015/0097159 A1 | 4/2015 | Apalkov | |
| 2016/0112192 A1 | 4/2016 | Earl | |
| 2017/0126654 A1 * | 5/2017 | Fu | H04L 9/0858 |
| 2018/0198608 A1 * | 7/2018 | Nordholt | H04B 10/5165 |

FOREIGN PATENT DOCUMENTS

| | | | | |
|---|---|---|---|---|
| JP | 2006528851 A * | 5/2006 | | |
| WO | WO-2005013549 A1 * | 2/2005 | | H04L 9/0858 |
| WO | WO 2017/001850 A1 | 1/2017 | | |
| WO | WO 2019/106353 A1 | 6/2019 | | |
| WO | WO-2019132679 A1 * | 7/2019 | | G06F 7/58 |

OTHER PUBLICATIONS

Aronson, S. et al. "Quantum Copy-Protection and Quantum Money," 2009 24th Annual IEEE Conference on Computational Complexity, Jul. 15-18, 2009, pp. 229-242.
Aronson, S. et al. "Quantum Copy-Protection and Quantum Money," ArXiv:1110.5353 [quant-ph], Cornell University Library, Oct. 24, 2011, in 14 pages. XP080534922.
Aaronson, S. et al. "Quantum Money from Hidden Subspaces," International Association for Cryptologic Research, vol. 20120411:155350, Apr. 1, 2012, pp. 1-46, XP061006070.
Bennett, C. "Quantum Cryptography Using Any Two Nonorthogonal States," Physical Review Letters, May 25, 1992, vol. 68, No. 21, pp. 3121-3124.
Brassard, G. et al. "Minimum Disclosure Proofs of Knowledge" Journal of Computer and System Sciences, Jan. 1988, vol. 37, pp. 156-189.
Bruß, D. "Optimal Eavesdropping in Quantum Cryptography with Six States," Physical Review Letters, Oct. 8, 1998, vol. 81, No. 14, pp. 3018-3021.
Croke, S. et al. "Security Details for Bit Commitment by Transmitting Measurement Outcomes," Physical Review A, Nov. 2012, vol. 86 No. 5, pp. 1-4.
Gavinsky, D., "Quantum Money with Classical Verification," Proceedings of the Annual IEEE Conference on Computational Complexity, Sep. 2, 2011, pp. 1-22.
Hayden, P. et al., "Summoning Information in Spacetime, or Where and When Can a Qubit Be?" Journal of Physics A, Mathematical and Theoretical, Mar. 2, 2013, pp. 1-6.
Kent, A. "Quantum Tasks in Minkowski Space," Classical and Quantum Gravity, vol. 29, No. 22, Oct. 18, 2012, pp. 1-17.
Kent, A. "Unconditionally Secure Bit Commitment" Physical Review Letters, vol. 83, No. 7, Aug. 16, 1999, pp. 1447-1450.
Kent, A. "Unconditionally Secure Bit Commitment by Transmitting Measurement Outcomes" arXiv: 1108.2879v2 [quant-ph], Apr. 2, 2012, in 5 pages.
Lo, Hoi-Kwong et.al. "Secure Quantum Key Distribution," Nature Photonics, vol. 8, Jul. 31, 2014, pp. 595-604.
Lunghi, T. et al. "Experimental Bit Commitment Based on Quantum Communication and Special Relativity," Physical Review Letters, vol. 111, No. 18, Nov. 1, 2013, pp. 1-16.
Pastawski, F. et al., "Unforgeable Noise-Tolerant Quantum Tokens," available from arXiv:1112.5356v1, Dec. 22, 2011, in 18 pages.
Pastawski, F. et al., "Unforgeable Noise-Tolerant Quantum Tokens," Proceedings of the National Academy of Sciences, Oct. 2, 2012, vol. 109, No. 40, pp. 16079-16082.
Vernam G.S. "Cipher Printing Telegraph Systems," American institute of Electrical Engineers, vol. XLV, Jun. 1926, pp. 109-115.
Wiesner, S. "Conjugate Coding," Sigact News, vol. 15, No. 1, Winter-Spring 1983. pp. 78-88.
International Search Report and Written Opinion received in corresponding PCT Application No. PCT/GB2016/051958 dated Sep. 23, 2016 in 11 pages.
Search Report from U.K. Intellectual Property Office for U.K. Application No. GB1511652.8, dated Jan. 25, 2017, in 1 page.
Written Opinion in Singapore Patent App. No. 11201710846Q, dated Oct. 18, 2018, in 5 pages.
Examination report for EP Application No. 16745136.8 dated Mar. 4, 2020; 4 pages.
Invitation to Respond to Written Opinion for Singapore Patent Application No. 11201710846Q dated Nov. 8, 2019; 1 page.
Response to Written Opinion for Singapore Patent Application No. 11201710846Q dated May 5, 2019; 13 pages.
Response to Written Opinion for Singapore Patent Application No. 11201710846Q dated Apr. 8, 2020; 8 pages.
Written Opinion for Singapore Patent Application No. 11201710846Q dated Sep. 12, 2019; 5 pages.
Gavinsky, D., "Quantum Money with Classical Verification", ArXiv:1109.0372v2 [quant-ph], Cornell University Library, Sep. 2, 2011, in 22 pages. XP080525214.

* cited by examiner

QUANTUM TOKENS

INCORPORATION BY REFERENCE TO ANY PRIORITY APPLICATIONS

This application is a continuation of U.S. application Ser. No. 15/739,413, filed Dec. 22, 2017, titled "QUANTUM TOKENS," which is a National Stage application of PCT Application No. PCT/GB2016/051958, filed Jun. 30, 2016, which claims priority to U.K. Provisional Application No. GB 1511652.8, filed Jul. 2, 2015, titled "FUTURE POSITION COMMITMENT". The entire contents of these applications are incorporated by reference herein and made part of this specification.

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to secure authentication. More particularly, the invention provides an authentication token that cannot be forged and can be transmitted by electromagnetic waves and/or other standard means of communication, as well as a method for issuing and validating the token.

Description of the Related Art

The redemption of tokens of various descriptions in exchange for goods and services, access to resources and other capabilities is a commonplace part of life today. For example, money and other forms of credit may exchanged for physical or virtual goods; passwords may be used to gain access to certain networks or data. However, in a world in which a token-issuing party does not or cannot have implicit trust in the party receiving the token for future validation, there can be an underlying desire to ensure that the token cannot be exploited unfairly. For instance, the token issuer may require assurance that the token cannot be copied and used many times, thereby giving access to more resources than it is intended to allow. That imperative (and indeed the motivation to the token recipient to forge the token) can and often does scale with the inherent value of the resource in question.

Accordingly, the provision of a secure authentication token is a known problem in the field of cryptography.

Various classical token-issuing schemes exist. Everyday currency is the most immediate example. However, as is known, no standard banknote is impossible to copy: forgery is a real world problem. Further, where a transaction is characterised by an overriding urgency or otherwise short timescales, classical, tangible banknotes and coins are of limited use insofar as the speed with which they can be transferred from one place to the next is fundamentally restricted. This property makes material money an asset of limited value in many situations, such as modern financial trading networks.

Turning then to virtual tokens, one solution commonly adopted is to issue a password at a first point, P, in space and time (for example, in return for payment) that can be used by the recipient as an authentication token at any one of a finite number of future points $Q_i$ (i=1, 2, ... n) in space-time. However, an immediate drawback of such an approach is that there can be no a priori prohibition on the receiving party redeeming the token at a plurality of those future points: once the password is known, it simply needs to be recalled and repeated in order to gain access to multiple resources consecutively or even simultaneously. Because of this risk, the token issuing party may feel obliged to check, when the password is returned at a given point $Q_k$ by the recipient in exchange for access the relevant resource, that the same password has not been used at any point either in the causal past of or space-like separated from $Q_k$. This can be cumbersome and can incur unacceptable delay, particularly if any of the points $Q_i$ are space-like separated from one another.

In some instances, the issuing party may determine a unique password (password) for use at each of the $Q_i$; ask, at point P, the receiving party at which future point they intend to use the password; and issue the relevant password accordingly. However, this approach may be appropriate only in a limited number of circumstances. For example, the receiving party may not know at which of the $Q_i$ they will want to redeem the token being issued at point P. Furthermore, even if he does know, he may wish to keep this information private: for instance, if the token is to be used to place a stock trade at some point $Q_k$ on a global financial network, the trader may not wish to give the market advance warning of the time or place of his intended trade.

Since the introduction of Wiesner's 'quantum money' in 1983 (see Wiesner, S. Conjugate coding. *Sigact News* 15, 78-88 (1983)), attempts have been made to exploit the properties of quantum mechanical systems to provide an unforgeable authentication token. In the simplest version of the quantum money approach, the token takes the form of a stored quantum state, the classical description of which is not known to the recipient. Since the laws of quantum mechanics dictate that such a state cannot be copied without destroying the original, these solutions are unconditionally secure. The term 'unconditional security' is used herein to refer to security that can be proven by relying only on established laws of physics, provided the protocol is followed faithfully. That is, such security proofs do not rely on the assumed practical intractability of a computational problem that can, in principle, be solved.

Furthermore, since quantum states can be encoded in photons of light or other electromagnetic radiation, with sufficiently good technology quantum money tokens can be sent at light speed: they do not suffer the drawback mentioned above of classical, physical tokens such as banknotes. Moreover, known techniques such as quantum teleportation and quantum secret sharing allow quantum states to be transmitted in a way that allows more flexibility in response to incoming data than would be possible by sending a token along a single, defined path at speeds up to and including light speed. Some examples of the advantages to be gained by exploiting these techniques are discussed in Kent, A. Quantum tasks in Minkowski space. *Classical and Quantum Gravity* 29, 224013 (2012); and in Hayden, P. et al., preprint 1210.0913 [quant-ph] (2012).

Many quantum money solutions have the further advantage of providing both perfect 'future privacy' and perfect 'past privacy', innate to many classical approaches. By future privacy here is meant that the party issuing the token at point P cannot know when or where it will be presented for redemption until the very moment that it is so presented. Thus, the recipient need not disclose details of his future movements in exchange for the token. Similarly, past privacy refers to the ability of the recipient to redeem the token at point $Q_k$ without unavoidably revealing information about his or the token's whereabouts between P and $Q_k$: so long as they are stored and transmitted securely, quantum tokens carry no record of their past locations. Future privacy and past privacy can be desirable or even imperative not only for individuals but also, for example, in the context of financial trading, where a record of past locations of the token implies a record of past locations where a trade could have been made. Such a record can encode valuable, exploitable information about trading strategies.

However, as is known to those of skill in the field quantum money solutions are not, to date, technically feasible: at present, the art lacks adequate technology for storing and reliably transmitting, at light speed, general quantum states. Progress towards a truly operational realisation of a quantum authentication token is likely to be slow, and it is probable that the technology, even when available, will at least initially be cumbersome and/or prohibitively expensive. Indeed, it is not implausible that the communication of classical data will always be significantly easier than the transmission of information encoded in quantum states.

We have appreciated that it would be advantageous to provide an unconditionally secure authentication scheme that does not rely on lengthy storage or transmission of quantum states.

SUMMARY OF THE INVENTION

The invention is defined in the independent claims, to which reference is now directed. Preferred features are set out in the dependent claims.

In its broadest aspect, the invention provides a scheme that uses quantum information to obtain some of the important advantages of quantum money just outlined, in a way that is technologically feasible today. In particular, the token itself in the present schemes is classical, so that the invention does not rely on the presently problematic long-term storage or transportation of quantum states. In spite of this, embodiments of the invention provide a token that cannot be copied, and which is limited in transmission speed only by the light signalling bound. According to the invention, the future privacy of the token recipient may be respected; and certain embodiments within the scope of the invention may also guarantee past privacy.

According to one aspect of the invention, there is provided a method comprising the steps of receiving, at a first space-time point, a plurality of random quantum states, each of the quantum states chosen from a set of non-orthogonal quantum states, and applying a pre-determined measurement to the quantum states to obtain a token comprising a sequence of classical measurement outcomes. The method further includes the step of presenting, at a second space-time point in the causal future of the first space-time point, the token in return for access to a resource.

According to another aspect of the invention, there is provided a method comprising the steps of generating, at a first space-time point, a plurality of random quantum states, each of the quantum states chosen from a set of non-orthogonal quantum states, and receiving, at a second space-time point in the causal future of the first space-time point, a token comprising a sequence of classical measurement outcomes. The method further includes the step of verifying whether the token corresponds to a statistically plausible result for a pre-determined measurement of the quantum states.

References herein to events or to the performance of method steps 'at' a space-time point are intended to comprise occurrences within an agreed, small (four-dimensional) region around the relevant point. For example, as the skilled person will appreciate the exchange of information generally requires classical and/or quantum data to be sent through agreed channels between two nearby secure sites controlled respectively by either of the parties to the exchange.

Furthermore, the term 'random' is intended throughout to mean perfect or near-perfect randomness. In preferred embodiments of the invention, the states are generated perfectly at random with a view to excluding any possibility that the scheme may successfully be cheated. However, those of skill in the field will appreciate that some deviations from perfect randomness can be tolerated, provided that the bounds on that deviation are known: in particular, slight deviations from perfect randomness do not, materially, compromise security, and are intended to fall within the scope of the claimed invention.

Preferably, the quantum states represent quantum bits, qubits. In some embodiments, each of the plurality of qubits may be encoded in a photon of electromagnetic energy or, alternatively, in a weak light pulse with low expected photon number. The invention in these embodiments may advantageously be simple to implement.

BRIEF DESCRIPTION OF THE DRAWINGS

Embodiments of the invention will now be described, by way of illustrative and enabling example only, with reference to the accompanying drawings, in which.

DETAILED DESCRIPTION OF THE PREFERRED EMBODIMENT

As outlined above, the light-speed signaling bound is one important motivation for the invention. In view of this, the present schemes will be described in a relativistic context, in which some or all of the space-time points of interest may be space-like separated from one another. This is not essential, however, and the more general application of the invention to non-relativistic settings will be apparent to those of skill in the art.

Figure 1:
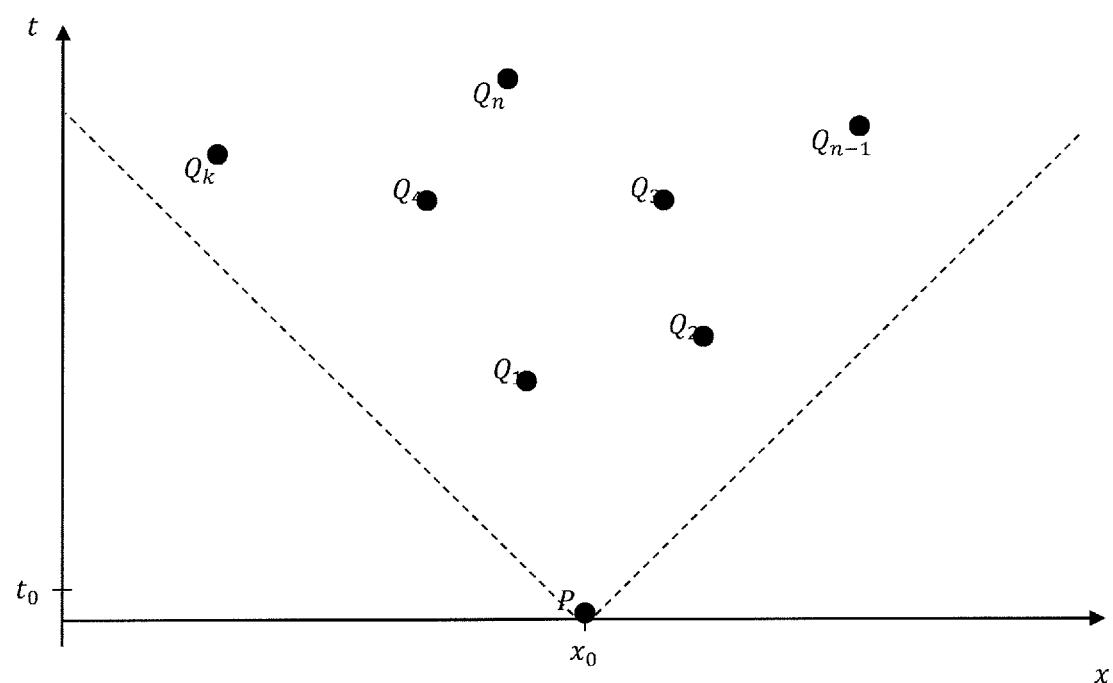
FIG. 1 is a schematic diagram of two-dimensional space-time, illustrating an exemplary situation in which the present invention finds application.

FIG. 1 is a schematic diagram of a simplified, two-dimensional space-time, illustrating an exemplary situation in which the present invention finds application.

A first party (A) wishes to receive from a second party (B) at a point $P=(x_0, t_0)$ in space and time a token that can she can return to him, in exchange for an asset, at some point $Q_k$ in the future of P. The token may be a voucher, password or other encoding of information of any of the sorts discussed above for allowing access to a particular resource. For example, in some embodiments of the invention the token acts as physical money, exchangeable for goods and/or services. In other embodiments, the token is a password for gaining access to a given network, which may be presented in digital form; in yet further embodiments, it represents virtual credit for use, for instance, in trading on a financial network. It is stressed that these applications are listed by way of example only.

As mentioned above and as will be discussed further below, in the present schemes the token received by A at P is to be valid for use only at a single space-time point, $Q_k$, in the causal future of P. (The dashed lines in FIG. 1 denote the light cone originating at P.) In the present scenario, A may choose to redeem the token at any one point $Q_k$ that is within a finite set of discrete space-time points $\{Q_i=(x_i, t_1)\}$, where i=1, 2, . . . n for some $n<\infty \in \mathbb{N}$. In some embodiments, n may be on the order of $10^3$, though depending upon the application of interest it may alternatively be many orders of magnitude larger or as small as 2.

Importantly, in view of the motivations discussed above embodiments of the present invention make no reliance on any level of trust between the parties A and B. It is assumed that A may try to cheat B by, for example, presenting the token more than once, or by attempting to forge the token. Similarly, as will be discussed below it is assumed that A requires future privacy; that is, she does not wish to reveal to B her chosen point $Q_k$ until that event itself is actually realised. (The consideration of past privacy is excluded in this particular embodiment.)

The following discussion assumes that the token issuer B is more generally an 'agency', with a network of agents distributed across the points $Q_i$ at which the token may be redeemed (as well as at point P) and each equipped with appropriate quantum sending/receiving devices and measurement apparatus.

In some embodiments, the token user A may also be a similar agency with a similar network of agents. For instance, A and B could both be financial institutions participating in a global financial network, with trading systems controlled by human agents and/or computers at many locations around the world.

Alternatively, A may be represented by a private individual (or a small set of individuals) who may only visit some of the points $Q_i$ and who wishes to keep her (or wish to keep their) movements, and in particular the token's location, private as far as possible. She may, for example, be equipped with a small device capable of receiving and measuring quantum states sent over short distances. Those states may originate from devices, which may resemble automatic teller machines, designed to generate and transmit quantum states securely and to receive classical data in a way that allows them to implement protocols for quantum key distribution and related cryptographic tasks. Such machines may be located around the world and controlled by a bank or consortium of banks or some other agency.

In any event, the invention supposes that B's agents operate with complete trust in one another and are able to share secret information securely between themselves. Thus, all of B's agents are aware of all quantum data that may potentially have been used to generate the data presented to them. In other words, the classical description of the string of random qubits sent by B to A at P is known to all of B's agents. These data may be either secretly pre-agreed, or sent secretly at light speed or at the fastest speed practical for the given network either before or after generation of the token, but sufficiently quickly so as to be available at any of the allowed space-time points at which the token might be redeemed.

Similarly, A's agents are assumed to operate with complete mutual trust and may also be able to share secret information securely among themselves at or near light speed. If light-speed or near-light-speed transmission is not feasible, then the scheme is still useful but the mobility of A's token is restricted. The schemes discussed below give A security based on the assumption that any sharing of information between her agents is done securely, and using separate communications channels to those used by B and his agents.

In communicating with their respective agents, both A and B could use any standard cryptographically secure communications scheme and any standard communications system. Some embodiments may make use of one-time pads to encrypt and decrypt the communications in accordance with Vernam G. S. Cipher printing telegraph systems for secret wire and radio telegraphic communications. *Journal American Institute of Electrical Engineers* XLV, 109-115 (1926) so as to ensure theoretically perfect security. These pads could be generated ahead of time and/or during the protocol, for example by using standard quantum key distribution schemes implemented by commercially available quantum cryptography apparatus. As the skilled reader will appreciate, many quantum key distribution schemes exist and are known. A recent review is given, for example, in Lo, H-K. et al. Secure quantum key distribution. *Nature photonics* 8, 595-604 (2014).

Furthermore, the present discussion assumes that both parties, together with any agents, have access to standard classical computing devices for carrying out the appropriate calculations and storing the resulting data.

Figure 2:
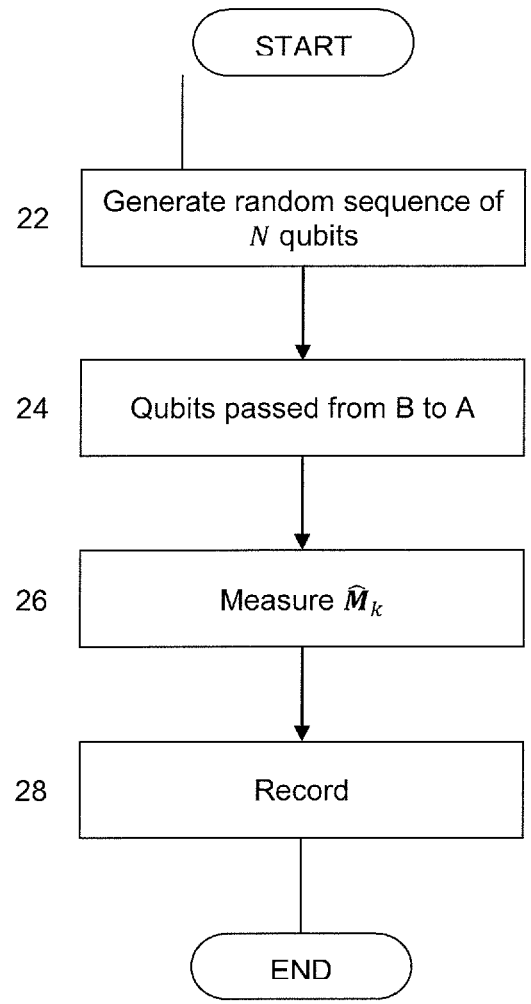
FIG. 2 is a flow chart illustrating a method of generating an authentication token in accordance with one aspect of the invention.

FIG. 2 is a flowchart illustrating a method 20 of generating an authentication token for use at a single future space-time point in accordance with a first embodiment of the invention. In a first step 22, party B generates a sequence of N quantum states, chosen independently at random. For good security, N is preferably on the order of $10^3$ or larger. In this embodiment, the states are ideally qubits realised as polarisation states of single photons or, realistically, weak light pulses with average photon number below one. The generation and transmission of photonic qubits is a well-known technique, details of which can be found, for example, in Lo, H-K. et al. Secure quantum key distribution. *Nature photonics* 8, 595 (2014) (and the references cited therein) and in Lunghi, T. et al. Experimental bit commitment based on quantum communication and special relativity. *Phys. Rev. Lett.* 111, 180504 (2013). In other embodiments, alternative two-level quantum mechanical systems such as electrons may be used instead to encode bits of quantum information in a suitable known manner. Furthermore, though qubit implementations are presently preferred for reasons of simplicity both of exposition and of implementation, the skilled reader will appreciate that the invention is not limited to the use of two-level quantum states, and still further embodiments may implement the present methods using d-level systems such as trapped ions to encode so-called qudit quantum states.

According to the present embodiment, each of the quantum states generated by party B is a pure state chosen from one of two possible bases: the computational basis, made up of the states $|0\rangle$ and $|1\rangle$, where $|0\rangle$ represents a photon polarised in the vertical direction and $|1\rangle$ a photon polarised in the horizontal direction; and the Hadamard basis, comprising the states $$|\pm\rangle := \frac{1}{\sqrt{2}}(|0\rangle \pm |1\rangle).$$

This set of four states (referred to herein as the 'BB84 states') is given by way of example only, and in other embodiments the states generated by B may be chosen instead from any number of (complete or incomplete) bases. A necessary condition is that the possible states are not mutually orthogonal. In preferred embodiments, the states are quite far from mutually orthogonal, such as the BB84 states; the six states of the protocol described in Bruβ, D. Optimal eavesdropping in quantum cryptography with six states. *Phys. Rev. Lett.* 81, 3018 (1998); or the infinite number of states described in U.S. Pat. No. 7,983,422. Reference is also made to Bennett, C. Quantum cryptography using any two non-orthogonal states. *Phys. Rev. Lett.* 68, 3121 (1992).

Furthermore, it is not essential for the states sent by B to A to be pure states such as those just listed. Indeed, experimental noise will in practice ensure that the states are not perfectly pure. As those of skill in the art will be aware, the identification of acceptable levels of noise and errors is routine.

Thus, the composite state generated by party B at point P may be, for example, $|\psi\rangle = |0\rangle_1 |+\rangle_2 |-\rangle_3 \ldots |0\rangle_j \ldots |1\rangle_N$, where the tensor products between the individual photon states, omitted for simplicity of notation, are implied. Again, the present embodiment assumes a product state $|\psi\rangle$ for simplicity of discussion and of implementation. However, the generation by B of N-partite entangled states for transmission to A is not excluded provided, as above, that it is chosen from a suitably large list of states (for example, $2^N$ or more states) that are not close to pairwise orthogonal.

Once generated, party B passes or sends the state $|\psi\rangle$ to party A, at step 24. In this example, since the individual qubit states are encoded as individual photons they may be sent through optical fibre or free space using standard, commercially available quantum key distribution sending and receiving apparatus. For example, the adaptation of the setup described in Lunghi, T. et al. Experimental bit commitment based on quantum communication and special relativity. *Phys. Rev. Lett.* 111, 180504 (2013) to the present schemes is straightforward. To give a concrete example, B may send to A a string of states in an agreed time sequence that constitutes a short transmission burst (such as 1000 states every microsecond within an agreed millisecond, for example).

In this embodiment, the short-distance communication at step 24 is the only point of the scheme at which transportation of quantum information is required. The skilled reader will appreciate that, although some errors may be incurred at this step, errors up to a threshold value can be allowed for by taking the number N of states to be sufficiently large to compensate for the associated error probability.

On receiving the composite state $|\psi\rangle$, A proceeds to carry out a pre-determined sequence of measurements on the qubit states at step 26. This measurement may take place at P or, should Alice have the technological capabilities to store and/or transmit quantum states reliably, at a later time and/or at a different point in space. In either case, the choice of measurement in this example assumes that A already knows, at the time of measurement, at which future point $Q_k$ she will want to redeem the token: the way in which she measures the state $|\psi\rangle$ is determined based on that choice. The measurements will be discussed in further detail below. At step 28, A then records the measurement outcome for each qubit classically. For example, she may write down the classical bits defining the outcomes, or input them to a computer memory. According to the invention, the resulting string of bits represents a (classical) token that A can then take with her through space-time to her chosen trade-in point $(x_k, t_k)$, or send to her agent at the point $x_k$ in space, to arrive by time $t_k$, for future redemption in return for an asset from B.

Those of skill in the art will appreciate that, in practice, A may attempt to measure each of the N states but obtain results only for a subset of those states. This may be because of losses in transmission, for example. In some embodiments, A may in this case provide feedback to B in real- or near-real-time about which qubit states produced a measurement outcome, based on the timings of the positive measurement results. Thus, for example, she may tell B that she obtained results for states 2, 5, 18, 23, and so on, in the sequence. Accordingly, the token in these cases may comprise only the successful measurement outcomes, and B need only communicate to his agents at each space-time point $Q_i$ the classical descriptions of those states. (As will be clear to the skilled reader, in situations in which losses are high the number of states generated and sent by B should be sufficiently high to ensure a final token of adequate length for security, in accordance with the discussion above.)

As mentioned, the measurements performed by A are chosen in dependence on the point $Q_k$ at which she decides that she will want to cash in her token. In this embodiment, the parties A and B pre-agree a set of measurement strings $\{\hat{M}_i = M_i^1, \ldots, \hat{M}_i^n)\}_{i=1}^n$, each of which will give a corresponding string of outcomes that can be valid only at a single one of the points $Q_i$. In other words, A cannot obtain (by any strategy) two strings of answers that would be statistically plausible results of two distinct measurement operators $\hat{M}_k$ and $\hat{M}_j$, j≠k on a state $$|\psi\rangle = |\phi_1\rangle_1 \ldots |\phi_N\rangle_N.$$

In particular, by measuring state $|\psi\rangle = |\phi_1\rangle_1 \ldots |\phi_N\rangle_N$ with the pre-agreed measurement operators $\hat{M}_k$, agreed to be those that will generate a token valid at $Q_k$, A cannot obtain (by any strategy) a string of answers that would be a statistically plausible result of any other operator $\underline{\hat{M}_j, j \neq k}$ according to the probability distribution assigned by quantum theory on the outcomes of the various measurements on the state. That is, given the state $|\psi\rangle$ and measurement $|\psi_l\rangle_l = |\phi\rangle$ each possible outcome of each possible measurement for which $\hat{M}_i^l = X$ on states for which $|\phi_l\rangle_l = |\phi\rangle$ may be expected to occur a given number of times, on average. A's token is said not to represent a statistically plausible set of measurement outcomes for an operator $\hat{M}_j$, j≠k on $|\psi\rangle$ if, after allowing for an accepted level of errors and according to standard statistical significance tests, the data making up the token does not conform to those expectations in respect of that operator on the given state. One set of measurement strings that is appropriate for the set of photonic qubits of the present embodiment, each in one of the BB84 states as given above, will now be derived. It is stressed that the following derivation is given by way of non-limiting, enabling example only, and those of skill in the art will appreciate that many alternative, appropriate measurements may readily be derived.

As mentioned, A may choose at P that she will redeem her token at any one of n space-time points in the causal future of P. Writing $2^{r-1} < n \leq 2^r$ for some $r \in \mathbb{N}$, the input state $|\psi\rangle$ may be chosen to comprise $N=rS$ qubits, where $S \in \mathbb{N}$ is preferably on the order of $10^3$ or greater for good security. In that case, and writing $k-1 = b_{r-1} b_{r-2} \ldots b_1 b_0$ in binary form, the measurement $\hat{M}_k^l$ to be applied to the $l^{th}$ qubit in seeking to generate a token valid at the chosen space-time point $Q_k$ may be chosen as follows.

Assume that $r'S+1 \leq l \leq (r'+1)S$ for some $r' < r$, and solve for $r'$. Then if, in the binary representation of $k-1$:

$$b_{r'} = 0, \text{ take } \hat{M}_k^l = \{\hat{P}_0^l, \hat{P}_1^l\};$$
$$b_{r'} = 1, \text{ take } \hat{M}_k^l = \{\hat{P}_+^l, \hat{P}_-^l\},$$

Where $\hat{P}_0^l = |0\rangle\langle 0|^l$, $\hat{P}_1^l = |1\rangle\langle 1|^l$, $\hat{P}_+^l = |+\rangle\langle +|^l$ and $\hat{P}_-^l = |-\rangle\langle -|^l$ are projections onto the BB84 states of the 2-dimensional Hilbert space of qubit 1, which may be carried out in accordance with any existing practical art.

With the measurement strings so defined, security follows because B (or his corresponding agent) can check that the token presented to him at $Q_k$ corresponds to a statistically plausible set of outcomes of the measurements $\hat{M}_k$ on the state $|\psi\rangle = |\varphi_1\rangle_1 \ldots |\varphi_N\rangle_N$ the classical description of which he knows and keeps secret. It can be shown that A is unable to operate on $|\psi\rangle$ in such a way, consistent with the known laws of physics, as to produce statistically plausible outcomes for more than one of the measurement strings $\hat{M}_i$; thus, she cannot cheat by using the state to generate a token that will be valid at more than one space-time point in the future of P. In particular, since she cannot clone the state she cannot cheat either by carrying out different measurements on two or more copies of it to obtain more than one token.

Future privacy also follows, because A can keep her choice of $Q_k$ (i.e., of $\hat{M}_k$) secret until she returns the token. Additionally, light-speed transmission of the token is possible since it amounts to nothing more than a classical string of bits, which can be sent by radio waves or by any other known means.

One can easily imagine situations in which A might not know, or prefer not to decide, at P when and where she will want to redeem her token. For example, if the token represents credit for a trade, then A may want to keep the option of making the trade anywhere in a global trading network at time $t_1$, or of waiting until a later time $t_2$, or a later still $t_3$, and so on. Her chosen location may also be time-dependent, and this sequence may not be known to her in advance. For instance, trading conditions at her first chosen point (say, London at $t_1$) may determine both whether she should trade and, if not, where she should consider next.

A second embodiment of the present invention finds application in this scenario. The following discussion assumes for simplicity that A may want to cash in her token at one of a first set $\{Q_i^{(1)}\}$ of space-time points in the causal future of P or, alternatively, to defer redemption to one of a number of further sets $\{Q_i^{(2)}\}$, $\{Q_i^{(3)}\}$ and so on, where all of the points in each set $\{Q_i^{(m)}\}$ are in the causal future of all of the points in the preceding set, $\{Q_i^{(m-1)}\}$. The application of the present embodiment also extends to more general configurations, not limited by causal relations in this way, and the assumption is made merely for ease of illustration. B's agents at all points are assumed to be able to generate and transmit quantum states as well as receive tokens. The method then proceeds following the sequence 30 outlined in FIG. 3.

In a first stage 32 of the method according to this embodiment, A and B proceed as described above with reference to FIG. 2. Thus, at space-time point P, B generates at step 322 a sequence of qubits and passes those, along a suitable channel, to A at step 324. At step 326, A measures the qubits using measurement operators $\hat{M}_k$, that she and B have agreed will give a valid token at the future point $Q_{k_1}^{(1)}$, at which she decides she may want to trade or otherwise gain access to the relevant resource or asset. Following step 328, at which she records her measurement outcomes classically as above, she then carries this token with her (or sends it to an agent) through space-time to the point $Q_{k_1}^{(1)}$.

On reaching $Q_{k_1}^{(1)}$ at step 34, A decides whether or not to trade in the token generated at P. If not, B's corresponding agent generates a new quantum state $|\psi^{(1)}\rangle = |\varphi_1^{(1)}\rangle_1 \ldots |\varphi_N^{(1)}\rangle_N$ and sends this to A as before.

In some realizations, A may have agents at all $Q_i^{(1)}$ who may all accept new states from B's corresponding agents at those points. In this way, B need not be made to learn any information about A's initial choice of location should she choose to postpone her trade-in of her token.

Based on a decision that she may now want to trade at point $Q_{k_2}^{(2)}$, A then carries out, at $Q_i^{(1)}$, the appropriate string of measurements $\hat{M}_{k_2}$ on the newly-supplied state $|\psi^{(1)}\rangle$. (Here, it is assumed for simplicity that each set $\{Q_i^{(m)}\}$ includes $2^r$ or fewer space-time points, and that the agreement between A and B is that A will choose from measurement strings defined in the manner described above each time she receives a new state $|\psi^{(m)}\rangle$. This is not essential, however, and the measurements at some or all stages may in other embodiments be different.) The resulting N bits of information represent an extension of the token generated at P, to which they can simply be appended to define a new token that will be valid at $Q_{k_2}^{(2)}$.

As will be apparent if, on reaching $Q_{k_2}^{(2)}$, A again decides to postpone her trade, the process just described can be iterated until she does decide to redeem her token. The token grows linearly in length at each stage. In particular, under the present assumptions, the length of the token generated at stage m−1 for presentation to B at stage m will be on the order of mN. It is noted that B's agents at all points are assumed to be aware of the identities of all strings of states sent, both P and at all intervening points at which A elected to extend, rather than to redeem, her token.

The scheme may be iterated for any number of rounds, limited only by technological constraints.

Security can be shown to follow from the security proofs derived in Kent, A. Unconditionally secure bit commitment by transmitting measurement outcomes. *Phys. Rev. Lett.* 109, 130501 (2012); in Croke, S. et al. Security details for bit commitment by transmitting measurement outcomes. *Phys. Rev. A* 86, 052309 (2012); and in Lunghi, T. et al. Experimental bit commitment based on quantum communication and special relativity. *Phys. Rev. Lett.* 111, 180504 (2013).

At each stage, A needs to generate a valid set of measurement outcomes for the new state supplied to her at that stage. Since the states supplied at each stage are independent, she can only generate two valid tokens if she can generate two valid sets of measurement outcomes for the states supplied at at least one point which, as discussed above, is not statistically feasible.

The embodiment just described with reference to FIG. 3 offers future privacy, but not past privacy: on returning the final token to B at stage m+1, A concedes information about her location at all past points $Q_{k_1}^{(1)}, Q_{k_2}^{(2)}, \ldots, Q_{k_m}^{(m)}$ visited, at which she had the option to trade with B. Past privacy for A can be guaranteed by refining the verification of the token, as follows.

In the embodiments discussed above, the token presented by A to B at her final chosen point $Q_{k_m}^{(m)}$ is simply a classical string of bits. In a further embodiment, A may instead encrypt the data using any standard cryptographically or unconditionally secure bit commitment scheme. Additionally, B presents to A the requirements for a token to be valid at $Q_{k_m}^{(m)}$ (in particular, to correspond to a valid path from P to $Q_{k_m}^{(m)}$)) in the form of a testing algorithm. This may be a simple list of all acceptable tokens, for example. Alternatively and more efficiently, B could specify the statistical tests that he would apply to the token presented by A.

Having exchanged this information, A and B in this revised embodiment proceed through a zero-knowledge proof protocol of the sort known in the art and described, for example, in Brassard, G. et al. Minimum disclosure proofs of knowledge. *J. Computer and System Sciences* 37, 156 (1988). This may allow the simultaneous guarantee for B that the token presented to him is valid; and for A that B learns no information about the path of the token other than its endpoint.

Figure 3:
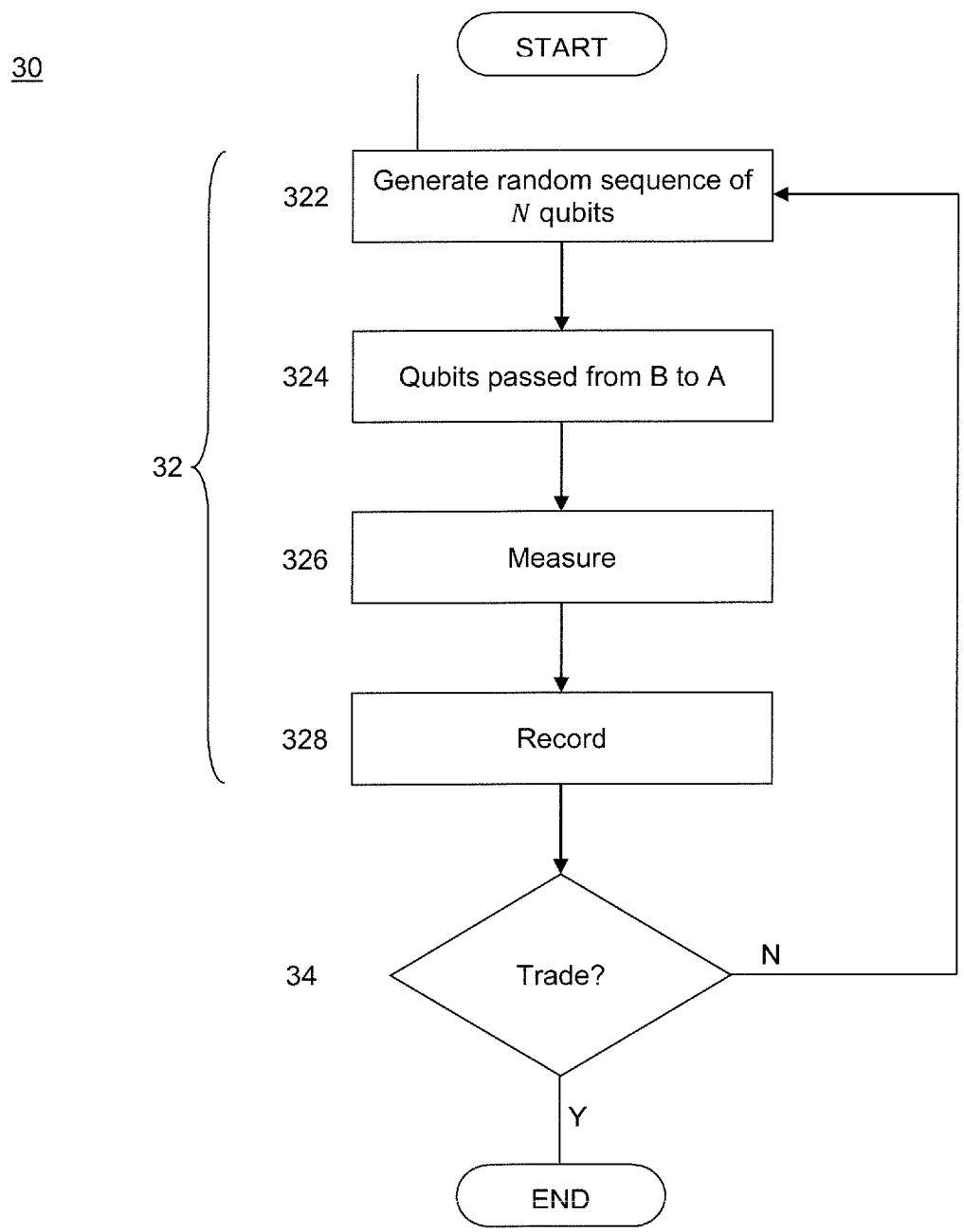
FIG. 3 is a flow chart illustrating a second method of generating an authentication token in accordance with one aspect of the invention.

In a yet further variant of the second embodiment of FIG. 3, A may commit herself from the outset to a given path of points $P \rightarrow Q_{k_1}^{(1)} \rightarrow Q_{k_2}^{(2)} \rightarrow \ldots \rightarrow Q_{k_m}^{(m)}$), each point in the sequence being in the causal future of the one preceding it. In this example, A receives from B at point P a set of mN random quantum states, and uses those to obtain an m-part token by carrying out the pre-agreed measurements $\hat{M}_{k_1}$ on the first N states, $\hat{M}_{k_2}$ on the second N states, and so on. To use the token at $Q_{k_p}^{(p)}$ for any $1 \leq p \leq m$, she simply hands to B's agent at $Q_{k_p}^{(p)}$ the first p segments of the token, in either encrypted or unencrypted form as discussed above, and B verifies that these define a valid causal path. Once the token has been used and accepted at $Q_{k_p}^{(p)}$ A may discard the remaining unused measurement data.

Thus, a semi-classical form of Wiesner's quantum money has been disclosed that provides unconditionally secure future position commitment. The invention finds application in any situation in which two non-trusting parties must co-operate in such a way that one can fairly and securely purchase,acquire or otherwise obtain from the other an asset or access to a resource.

What is claimed is:

1. An agency system comprising:
    a hardware device that generates or receives, at a first space-time point, a plurality of random quantum states, each of the quantum states chosen from a set of non-orthogonal quantum states;
    a measurement apparatus that applies a pre-determined measurement, from a plurality of possible pre-determined measurements, to the quantum states in order to obtain a token comprising a sequence of classical measurement outcomes, wherein the sequence of classical measurement outcomes is valid at a single space-time point; and
    a communications system that sends the token to a second agency system at a second space-time point in the causal future of the first space-time point, wherein the second agency system verifies whether the token corresponds to a statistically plausible result for the pre-determined measurement applied to the plurality of quantum states, before allowing access to a resource.

2. The system of claim 1, wherein the quantum states are chosen independently randomly from among pure states of a plurality of possible bases for a quantum state space.

3. The system of claim 2, wherein the quantum state space is a two-dimensional qubit space and the quantum states represent quantum bits (qubits).

4. The system of claim 3, wherein each of the plurality of quantum states comprises BB84 states for the two-dimensional qubit space.

5. The system of claim 3 or claim 4, wherein each of the qubits is encoded in a photon of electromagnetic energy.

6. The system of claim 5, wherein each of the qubits is encoded as a polarization state of the photon.

7. The system of claim 6, wherein each qubit is represented by the polarization state of a weak light pulse with a low expected photon number.

8. The system of claim 2, wherein the pre-determined measurement comprises a projection of each of the plurality of quantum states onto one of the pure states of the corresponding quantum state space.

9. The system of claim 1, wherein the pre-determined measurement is applied at the first space-time point.

10. The system of claim 1, wherein the quantum states represent quantum bits (qubits).

11. The system of claim 1, wherein the pre-determined measurement is such that possible measurement outcomes give a valid token for the second space-time point.

12. The system of claim 11, wherein a probability that the result of the pre-determined measurement gives a valid token for a third space-time point separated from the second space-time point is small.

13. The system of claim 12, wherein the probability that the result of the pre-determined measurement gives a valid token for the third space-time point is negligible.

14. The system of claim 1, wherein the communications system encrypts the token prior to sending the token.

15. The system of claim 1, wherein the plurality of quantum states are entangled.

16. The system of claim 1, wherein the token comprises only the measurement outcomes corresponding to quantum states of the plurality of random quantum states, for which the measurements were successful.

17. The system of claim 1, wherein the communications system sends data identifying quantum states of the plurality of random quantum states, for which the measurements were successful.

18. The system of claim 1, wherein the hardware device:
    receives, at a fourth space-time point in the future of the first space-time point and in the past of the second space-time point, a second plurality of quantum states;
    applies a second pre-determined measurement to the second plurality of quantum states to obtain a second sequence of classical measurement outcomes;
    appends the second sequence of classical measurement outcomes to the token, forming an extended token; and
    sends the extended token to the second agency system at the second space-time point.

19. The system of claim 18, wherein the hardware device iterates, at each of a plurality of successive time-like separated space-time points in the future of the first space-time point and in the past of the second space-time point, the steps of:
- receiving a further plurality of quantum states;
- applying a pre-determined measurement to the plurality of quantum states to obtain a further sequence of classical measurement outcomes; and
- appending the further sequence of classical measurement outcomes to the token, such that the extended token presented at the second space-time point comprises each of the plurality of sequences of classical measurement outcomes.

20. The system of claim 1, wherein the hardware device generates, at a fourth space-time point in the future of the first space-time point and in the past of the second space-time point, a second plurality of quantum states, and wherein the second agency system verifies whether the token includes a statistically plausible result for a first pre-determined measurement on the first plurality of quantum states and a statistically plausible result for a second pre-determined measurement on the second plurality of quantum states.

21. The system of claim 20, wherein the hardware device literates, at each of a plurality of successive time-like separated space-time points in the future of the first space-time point and in the past of the second space-time point, the step of generating a further plurality of quantum states, wherein the communications system sends an extended token comprising a plurality of sequences of classical measurement outcomes, and wherein the second agency system verifies whether the extended token includes a statistically plausible result for each of a plurality of respective pre-determined measurements on each generated plurality of quantum states.

22. The system of claim 1, 19, or 21, wherein the hardware device:
- receives, at the first space-time point, multiple pluralities of random quantum states, each of the quantum states chosen from a respective set of non-orthogonal quantum states;
- applies a respective pre-determined measurement to the quantum states to obtain an extended token comprising a number of sequences of classical measurement outcomes; and
- sends a portion of the extended token to the second agency system at the second space-time point.

23. The system of claim 1, 19, or 21, wherein the hardware device:
- generates, at the first space-time point, multiple pluralities of random quantum states, each of the quantum states chosen from a respective set of non-orthogonal quantum states; and
- sends an extended token comprising a number of sequences of classical measurement outcomes to the second agency system at the second space-time point, wherein the second agency system verifies whether the extended token corresponds to a statistically plausible result for respective pre-determined measurements on each of the pluralities of quantum states.

24. The system of claim 1, wherein a unique pre-determined measurement from the plurality of possible pre-determined measurements is assigned to each space-time point.

25. The system of claim 1, wherein the pre-determined measurement comprises a pre-determined sequence of measurements based on a pre-agreed set of measurement strings.

* * * * *